Sept. 20, 1960  C. DIJKSTRA  2,953,306
DISPERSING GAS IN A CONFINED LIQUID
Filed Dec. 22, 1954  2 Sheets-Sheet 1
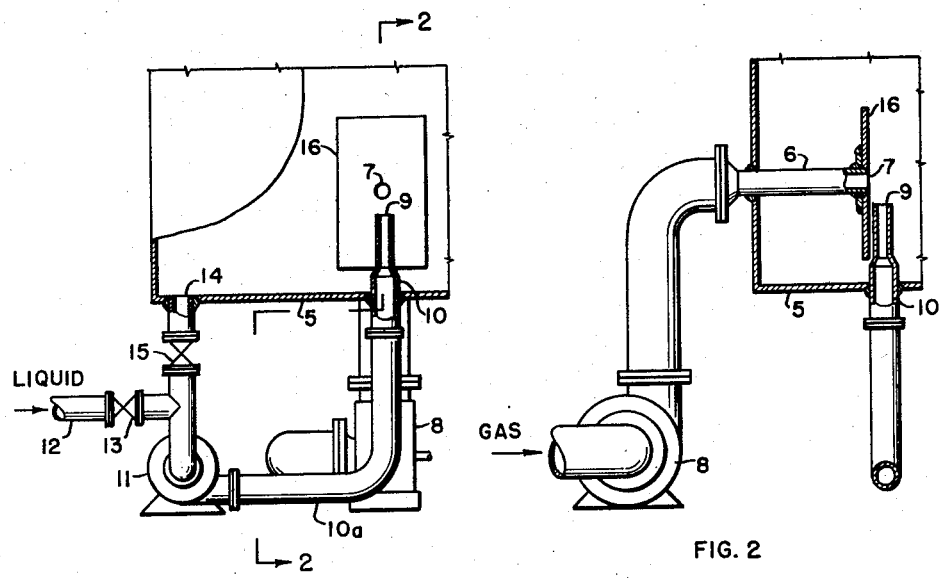
FIG. 1
FIG. 2
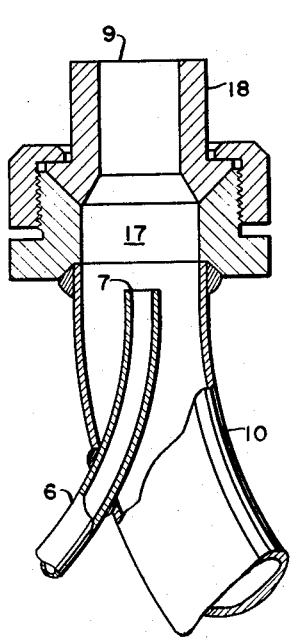
FIG. 3
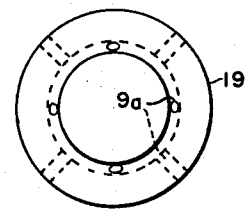
FIG. 5
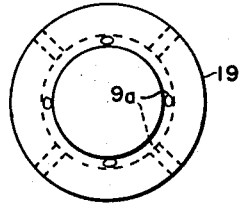
FIG. 4
INVENTOR:
CHRISTIAAN DIJKSTRA
BY: *Oswald H. Milmore*
HIS ATTORNEY

2,953,306

DISPERSING GAS IN A CONFINED LIQUID

Christiaan Dijkstra, Delft, Netherlands, assignor to Shell Oil Company, New York, N.Y., a corporation of Delaware Filed Dec. 22, 1954, Ser. No. 476,939

1 Claim. (Cl. 239—407)

The invention relates to apparatus for dispersing a gas in the form of small bubbles within a body of liquid contained in a vessel.

Many difficulties are involved in achieving a fine dispersal of a gas in a liquid which is substantially at rest, i.e., which is wholly stationary or which is moving through the vessel with such a low velocity that no appreciable turbulence occurs, such as is often encountered in treating liquids with gases, especially if it is necessary to limit as much as possible the energy to be expanded in effecting the distribution. The problem involves not only the local formation of a large number of small gas bubbles but also measures to prevent the fine bubbles, once formed, from combining in the relatively quiescent liquid mass to form larger bubbles that have a smaller total surface and rise more rapidly to the liquid surface.

To disperse a gas in a liquid contained in a vessel it has already been proposed to bring a liquid stream and a gas stream together and to lead the resulting mixture in the form of a dispersion containing fine gas bubbles into the vessel containing the liquid. This was heretofore deemed necessary because of the difficulty of producing small gas bubbles from a single gas orifice submerged in the liquid at practicably large gas flow rates; these proposals did not, however, furnish a complete solution to the problem insofar as low consumption of energy was a requirement. Thus, it has been proposed, for example, to employ a liquid jet ejector to produce a flowing gas-liquid mixture, but an apparatus of this type consumes a large amount of energy merely to produce a mixture with a relative low gas-to-liquid ratio; thus volumetric gas-to-liquid ratios higher than unity are difficult to attain. The energy consumption of such devices is further increased if a long mixing tube, necessary to achieve a complete dispersion of the gas as small bubbles, is fitted to the outlet end of the ejector.

Excessively high energy expenditure is also experienced when a mixture formed by the confluence of a gas and a liquid stream is forced through a long pipe or coil and/or through one or more restricted passages, such as narrow slots or small openings, of which the size is of the same order of magnitude as that of the bubbles desired, e.g., 0.01 to 0.1 inch, to disrupt the large gas bubbles and create the fine dispersion.

Finally, prior methods have devoted insufficient attention to preventing the formation of large gas bubbles by the combination of small bubbles already introduced into the vessel; this is true both of methods wherein gas and liquid are pre-mixed and the mixed stream is introduced into the liquid body and of methods wherein the gas is introduced directly into the liquid body from a gas duct. Such a formation of large bubbles tends to occur whenever the stream of gas bubbles is retarded before the small bubbles are sufficiently distributed through the liquid mass in the vessel. Thus, particularly at high rates of gas emission from a single submerged orifice, the speed with which the issuing bubbles ascend through the liquid is so low that the subsequent bubbles come into contact with previously discharged bubbles to form larger ones; the momentum of gas bubbles is insufficient to keep them distinct. Attempts to provide a plurality of orifices on a single nozzle and thereby reduce the gas emission rate per orifice have led to similar results because of the insufficient separation of the gas bubbles, which have low momentum and do not separate widely even with divergent orifices. Moreover, prior efforts to spread out gas issuing at spaced orifices or a peripheral slot of a nozzle by the aid of liquid currents have not been finally successful because of the creation of a stagnant zone within the envelope of the jets, resulting in the formation of large bubbles. The provision of an array of discharge orifices distributed over a considerable area of the vessel also requires a high expenditure of energy and involves a costly installation that must be frequently serviced due to the tendency of such orifices to become clogged, leading to troublesome interruptions.

It is an object of this invention to provide an improved apparatus for effecting the dispersal of gas in the form of fine bubbles at high rates of gas emission in a non-turbulent, i.e., substantially quiescent body of liquid with a minimum expenditure of energy. Ancillary thereto, it is an object to achieve the said object with high volumetric gas to liquid ratios, e.g., above 8.

Other objects are to minimize the tendency of the fine bubbles to combine to form larger bubbles; to promote the distribution of the fine bubbles through a large volume of the liquid body contained in the vessel with a low expenditure of energy from a single locality; and to provide an apparatus that is simple, inexpensive, compact, and able to remain in operation over extended periods.

In summary, according to the invention a gas stream is supplied under pressure and flowed confluently to a turbulent liquid stream to form a mixture-stream, said streams being brought together as coarse jets, preferably as full jets or at any rate as jets that are not finely subdivided by flow through very narrow passages, the resulting mixture-stream is passed as a turbulent, submerged, progressively widening current through the liquid body starting at a point near to the confluence of the gas and liquid streams, and the gas is distributed as fine bubbles over the progressively widening area of the mixture-stream solely by the turbulence thereof and throughout a large part of the liquid body sufficient to prevent any substantial combination of the fine bubbles to form larger ones, the latter distribution being effected by the momentum of the mixture-stream, which flows essentially unimpeded through the liquid body in any desired direction. The gas stream is suitably supplied via a gas duct and is engaged by the liquid stream at the point of confluence, which may be situated immediately before the entry of the gas into the quiescent liquid body.

In the embodiment claimed herein, the gas stream is surrounded by the liquid stream, which flows in the same direction, and brought into engagement therewith shortly prior to the issue of the gas into the liquid body to form a preliminary mixture in which the gas is not, however, yet finely dispersed, and the mixed stream, after a short travel through a mixing tube or nozzle, preferably with a length not exceeding five times the diameter thereof, is discharged into the liquid body with sufficient turbulence to form the fine bubbles and with sufficient velocity to distribute the bubbles and prevent recombination, as a plurality of separate, fractional jets that are spaced apart and preferably divergent so as to flow independently through the liquid body and so avoid the creation of a more or less peripherally continuous annular jet in the interior of which there can be a stagnant zone suitable for the combination of small bubbles.

The turbulent liquid jet flows through the liquid body with an initial velocity sufficient to carry off the bubbles at a rate to avoid combination, advantageously in excess of 8 ft. per sec., e.g., 10 to 50 ft. per sec. Even higher rates may be used, but usually become less advantageous because of higher energy consumption. Such high liquid velocities also insure the required turbulence, turbulence of the liquid stream in the liquid body being characterized by dynamic forces that are large in relation to viscous flow forces.

It has been found that, by following the procedure according to the invention large amounts of gas can be incorporated in a finely distributed state within a liquid stream with but a relatively small energy consumption. The gas supplied under pressure is, in this technique, disrupted into fine gas bubbles mainly by the turbulence of the liquid stream while the latter is flowing unconfined through the liquid body (instead of by special, energy-consuming devices or impingement against baffles) and the flow of the resulting mixture-stream is not appreciably impeded or obstructed (as a consequence of the absence of a long mixing tube and of restricted passages or narrow discharge orifices or slots) so that the mixture-stream can readily distribute itself throughout a sufficiently large part of the liquid body contained in the vessel by means of its own kinetic energy to prevent or significantly hinder combination of the small bubbles, provided care is taken to insure that the mixture-stream is not prematurely retarded by the vessel or its fittings, such as the supply pipes and other elements by which the mixture or other fluids are fed into the vessel. For example, it was found that with a turbulent water stream having a discharge velocity of 10 ft. per sec., a volume of air which is in excess of three times the volume of the water stream can be effectively dispersed to form bubbles with diameters of the order of one-tenth of an inch, and that this ratio can be increased considerably, e.g., to over 25, with higher water stream velocities.

The invention will be described further by reference to the accompanying drawings forming a part of this specification and showing certain specific embodiments by way of illustration, wherein:

Figure 1 is a vertical sectional view through a part of a vessel containing the body of liquid and provided with a dispersing device according to the invention wherein the gas stream is engaged by a liquid stream after issuing from a confined duct;

Figure 2 is a sectional view taken on the line 2—2 of Figure 1;

Figures 3 and 4 are vertical sectional views of two modified embodiments of the dispersing device wherein the gas stream is engaged by a liquid stream prior to issuing from a confined duct;

Figure 5 is a plan view of Figure 4; and

Like reference numbers denote like or corresponding parts in the several views.

Figure 6:
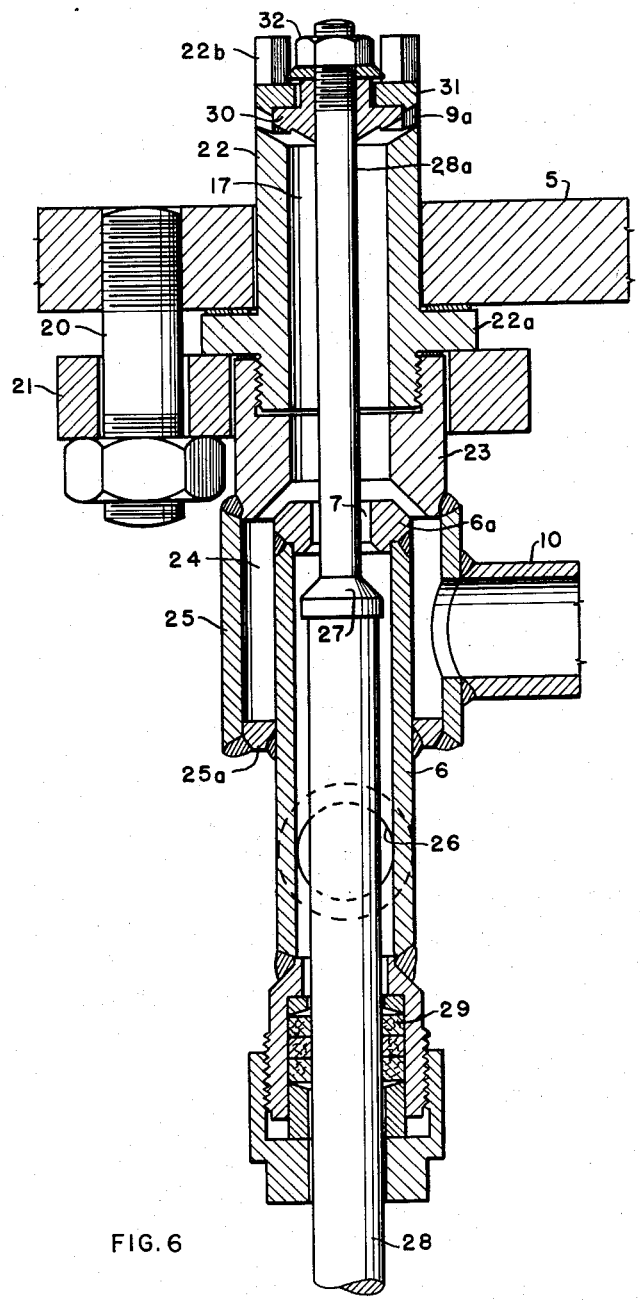
Figure 6 is a vertical sectional view of a further embodiment operating on the principle of that of Figures 4 and 5 but provided with closing and regulating means.

In Figure 1, 5 indicates the bottom of a vessel containing the liquid body into which the gas is to be dispersed; this vessel is provided with the necessary liquid supply and liquid and gas draw-off means, which will be arranged in accordance with the particular process to be carried out therein and are not shown. A gas duct 6 extends into the vessel and has an open orifice 7; it is supplied with gas under pressure from a suitable source, represented by a blower 8. At a short distance in front of the orifice is the open orifice 9 of a liquid supply pipe 10 which extends upwardly through the vessel bottom and is supplied via a connecting pipe 10a with liquid by a pump 11 from any source, such as from an outside one through an inlet pipe 12 and valve 13 or from the vessel through a recycle pipe 14 and a valve 15 or, by adjustment of the valves, from both these sources. The pipe 10 may have a short discharge section of reduced diameter, as shown, to attain the requisite high velocity and turbulence. The extended center lines of the orifices 7 and 9 intersect at an angle which is 90° in the embodiment shown but which may also have a different value. The diameter of the liquid orifice 9 is preferably larger, e.g., from 10 to 100% larger, than the diameter of the gas orifice 7. A vertical screen 16 is preferably mounted about the duct 6 at the orifice thereof.

In operation, the vessel is filled to a height above the top of the screen 16 to form a more or less quiescent body of liquid, liquid is supplied through the pipe 10 at a rate to issue from the orifice 9 as a turbulent stream that jets through said liquid body, and the gas to be dispersed is supplied through the duct 6 and issues from the orifice 7 substantially at right angles to the direction of movement of the liquid stream. The confluence of the liquid and gas streams results in the formation of a mixture-stream containing many fine gas bubbles differing but little from one another in size even when the gas is supplied at rates well above the critical supply rate as considered below. The mechanism is believed to be as follows: The liquid stream engages the gas and removes it from the environs of the orifice 7 at a sufficient rate to reduce appreciably the tendency of gas to engage previously discharged gas, whereby no excessively large bubbles are formed. The turbulence of the liquid subjects these entrained bubbles to dynamic forces that distribute the bubbles over the cross-section of the stream and may result in the further disruption thereof to form finer bubbles. The unconfined flow of the mixture stream results in the progressive widening thereof by picking up liquid from the surrounding liquid body contained in the vessel, thereby causing the bubbles to be distributed laterally throughout an effective volume of the liquid body; this volume is so large that the fine bubbles are no longer able to combine to form larger bubbles.

The significance of the foregoing can be better appreciated by comparing the action with one wherein no turbulent liquid stream is provided. In the latter case small bubbles are formed (from a suitably small orifice 7) only at gas rates below a critical value which, for orifices with diameters of the order of 0.04 to 0.5 in., appears to be independent of the orifice size and, hence, independent of the issuing air velocity; in the case of water and air at about atmospheric pressure the value is about 10–15 cu. in. per sec. Only about the same total gas rate can be dispersed by providing a cluster of closely adjacent orifices. About this limit, in addition to the small bubbles, solitary bubbles of much larger size are formed, and at flow rates somewhat above the critical most of the gas is in the state of large bubbles. Also, regardless of bubble size, such bubbles ascend almost vertically through the liquid body and are not distributed therein. However, by providing the liquid jet according to the invention, the movement of the gas bubbles away from the orifice 7 is powerfully supported by the kinetic energy of the liquid jet and fine, uniform dispersions can be obtained with gas flow rates several times the critical rate and the fine bubbles are, moreover, effectively distributed.

The screen 16 is highly desirable to insure the formation of a mixture stream containing only fine bubbles; its function is to prevent contact between this stream and larger bubbles that would otherwise collect in the wake of the gas duct 6. Thus, in experiments with apparatus in accordance with Figures 1 and 2 but omitting the screen 16, it was found that uniform fine dispersions could be obtained only at gas flow rates about two to three times the critical; at gas flow rates above about 30 cu. in. per sec. large bubbles would accumulate on the top side of the duct 6 near the orifice 7, where there was a relatively dead water zone. A part of the mixture stream would flow past this zone and the small bubbles reaching it would combine readily with the accumulated large bubbles to form still larger bubbles.

It has been found that, by means of the apparatus shown in Figure 1 and 2, a stream of water issuing from the orifice 9 at approximately 10 cu. in. per sec. with a velocity of 10 ft. per sec. was sufficient to effect the fine dispersal of over 30 cu. in. per sec. of air, producing a dispersion wherein the gas bubbles have an average size of the order of 0.1 inch and the variation in the sizes of the bubbles from each other is considerably less than without the turbulent liquid stream but with the same gas flow rate. The ratio of gas to liquid can be increased considerably when the water velocity is increased; this also brings about a decrease in the size of the gas bubbles. While circular orifices were shown, it is evident that other shapes may be used; thus, the ends of the duct 6 and pipe 10 may be flattened to be elongated to form slit-like orifices extending either in the direction normal to the plane of their axes or in the plane of their axes, the latter being preferred. Also, the orientation of the apparatus illustrated, wherein the liquid jet emerges from the orifice 9 upwards, while usually preferred, is not an absolute requirement; Figures 4-6, for example, show liquid jets that are not upwardly directed.

In the embodiment of Figure 3, the gas supply duct 6 extends through the wall of the liquid supply pipe 10 so that the gas orifice 7 is concentrically within the pipe and situated only a short distance, preferably not over five times the maximum pipe diameter, back from the orifice 9 of a nozzle 18 which is fitted to the end of the liquid pipe 10. This orifice is advantageously restricted in relation to the mixing chamber to increase the velocity of the emerging stream. The operation is similar to the embodiment previously described, with the difference that the short mixing chamber 17 through which the mixture-stream flows before issuing from the orifice 9 brings the liquid into contact with the gas so as to promote the disruption of the latter into small bubbles and the at least partial distribution thereof already before issue into the liquid body contained within the tank. It was found that with such an arrangement a considerably larger gas to liquid ratio and, at the same time, smaller bubbles can be obtained than with the apparatus according to Figures 1 and 2. The volumetric gas to liquid ratio can be easily increased to 25, a ratio which can never be obtained with a water-jet pump or eductor. It may be observed that the mixture stream emerging from the orifice 9 is not yet in the form of the final dispersion, the bubbles being usually only somewhat smaller than in the case of Figures 1 and 2; further break-up of the bubbles and distribution thereof in the body of liquid occurs by the action of the turbulent liquid stream after issue from the orifice 9, in the manner described above.

Whereas in the mixing apparatus according to Figure 3 the mixture of gas and liquid is discharged into the liquid body contained in the vessel as one full jet, in the apparatus shown in Figures 4 and 5 this occurs as a plurality of separate, fractional jets, e.g., 8 to 12 in number, which issue through a corresponding number of smaller orifices 9a formed in the nozzle tip 19 which is fitted to the end of the liquid pipe 10. It is a particular feature that the axes of the orifices 9a are divergent and so situated in relation to each other that each fractional jet is "free," i.e., surrounded on all sides by the quiescent liquid body, thereby avoiding the possibility of several jets cooperating to form an annularly continuous or substantially continuous current or jet within which a stagnant or "dead water" zone can be occluded. Such a zone would prevent the proper distribution of the fine bubbles and greatly reduce the efficiency of the apparatus by permitting fine bubbles to combine into larger ones. As is evident from Figures 4 and 5, the orifices are divergent and situated at sufficient distances apart to prevent such a sheet-like current or screen from being formed; instead, they are directed so that the mixture-streams remain distinct despite the progressive widening of each stream in moving away from the nozzle tip and the bubbles are spread throughout the liquid body in the vessel, thereby the small bubbles emerging from the orifices 9a and/or formed by the turbulence of the stream after emergence are effectively prevented from combining with each other to form larger bubbles. This device is, therefore, capable of handling very large quantities of gas with but small quantities of liquid from the pipe 10.

It should be noted that the size of the openings 9a is not related to the required size of the fine bubbles and that the orifice diameters may be considerably in excess of the latter; hence the use of the nozzle tip 19 with a plurality of smaller openings 9a to replace the nozzle 18 of Figure 3 need not lead to any considerable increase in the resistance met by the mixture of gas and liquid emitted from the mixing chamber 17. In fact, tests have shown that with nozzles according to Figures 3 and 4 the supply pressures of the gas and liquid were practically equal under comparable flow conditions. The total flow area provided by the orifices 9a may be the same as that provided by the orifice 9 in the nozzle 18. The purpose and function of the openings 9a is, therefore, not to break down the gas into fine bubbles but to form divergent jets and thereby attain a better distribution into the liquid body. It is evident that both in the case of Figure 3 and in that of Figures 4 and 5, wherein high gas to air ratios, such as 10 to 30 and higher are dealt with, there is usually only partial subdivision of the gas bubbles within the liquid stream while still in the mixing chamber 17; the fine gas bubbles are formed and distributed mainly after emergence.

To prevent liquid from entering the gas duct when the apparatus is not in use, the orifice of the gas duct may be provided with a shut-off valve, e.g., a non-return valve or a hand-operated valve. It may also be advantageous to make the openings 9a in the last-described embodiment adjustable in size. A construction incorporating both these improvement is shown in Figure 6.

The apparatus in Figure 6 is supported from the floor 5 of the vessel through bolts 20 and a ring 21 that engages a flange 22a on a tubular nozzle tip 22 protruding upwards through the floor and threaded to a connecting tube 23. A liquid-supply chamber 24 is formed by a wall 25 welded to the bottom of the tube 23 and communicates with the liquid supply pipe 10. The gas supply duct 6 is welded to the bottom wall 25a of the supply chamber and extends upwards into the chamber; it communicates at the bottom through an opening 26 to a source of gas. The upper end of the duct 6 has a transverse wall 6a containing the gas orifice 7. The lower face of this wall is bevelled to form a seat for a valve 27 which is part of a valve rod 28 extending within the duct 6 and through a gland 29 to the outside of the mixing device. By its upward movement the valve rod can bring the valve 27 onto the seat in order to prevent liquid from the vessel from entering the gas duct 6 and flowing out through the opening 26.

In this construction the openings 9a are formed by providing a plurality, e.g., six, vertically elongated slots 22b in the upper part of the nozzle tip 22; this part has a larger internal diameter than the main part enclosing the upper part of the mixing chamber 17 and the lower extremities of the slots are advantageously inclined to conform to a frustum of a cone. The top of the mixing chamber is closed by a valve member including a lower head 30 having a frusto-conical under-face and slidable within the upper part of the nozzle tip, and an upper part 31 provided with radially directed projections which extend into the slots 22b and have lower surfaces aligned with that of the head 30. The valve is fastened to the top part 28a of the valve rod by a nut 32.

When the valve rod is in its lowest position the openings 9a are completely closed, and if necessary the liquid supply pipe 10 can be blown through the gas from the duct 6, which may be important in the case of liquid which causes deposits or which solidifies. The orifices 9a are opened progressively as the valve rod is raised; thereby the parts of the slots that are to function as the orifices 9a for the passage of the mixture-stream can be adjusted. At the extreme upward position of the valve rod the valve 27 is seated. The operation of the apparatus insofar as dispersal of the gas is concerned is the same as described for the embodiment of Figures 4 and 5.

As examples of the types of treatment in which the invention can be applied may be mentioned asphalt blowing, in which an oxygen-containing gas, such as air, is the gas which is brought into contact with heated asphalt, which is the liquid, in order to obtain a partial oxidation of the asphalt; and the regeneration, by means of oxygen-containing gas, such as air, of spent solutions (known as "doctor" solution and "solutizer" solution) used to remove undesirable sulphur compounds from hydrocarbon oils.

Subject matter not claimed herein is claimed in a divisional application, Serial No. 4,720, filed January 26, 1960.

I claim as my invention:

Apparatus for mixing gas and liquid adapted to be mounted within a vessel comprising a tubular mixing chamber connected at the lower end thereof with an enlarged liquid supply chamber, a liquid inlet for the liquid supply chamber, a gas duct extending from beneath said liquid supply chamber and having at the top thereof an upwardly directed gas orifice disposed to inject gas under pressure into liquid from the liquid supply chamber, a valve seat for the gas duct, a vertically reciprocable gas duct valve for said valve seat, the side wall of the mixing tube having a plurality of vertically elongated slots forming divergent discharge orifices for mixed gas and liquid, a vertically reciprocable outlet valve cooperating with said slots to vary the effective areas thereof, and a valve rod interconnecting said gas duct and outlet valves.

References Cited in the file of this patent

UNITED STATES PATENTS

| | | |
|---|---|---|
| 399,200 | Koehler | Mar. 5, 1889 |
| 524,888 | Craney | Aug. 21, 1894 |
| 1,001,557 | Ruggles | Aug. 22, 1911 |
| 1,740,441 | Chogo | Dec. 24, 1929 |
| 1,853,045 | Gnau | Apr. 12, 1932 |
| 1,999,116 | Sidney | Apr. 23, 1935 |
| 2,012,623 | Boyd | Aug. 27, 1935 |
| 2,020,850 | Myhren et al. | Nov. 12, 1935 |

FOREIGN PATENTS

| | | |
|---|---|---|
| 136,685 | Australia | Mar. 14, 1950 |
| 467,359 | Great Britain | June 16, 1937 |
| 609,508 | Germany | Feb. 16, 1935 |